Feb. 24, 1942.  F. X. VELTON  2,274,309
WASHER
Filed July 9, 1940  5 Sheets-Sheet 1
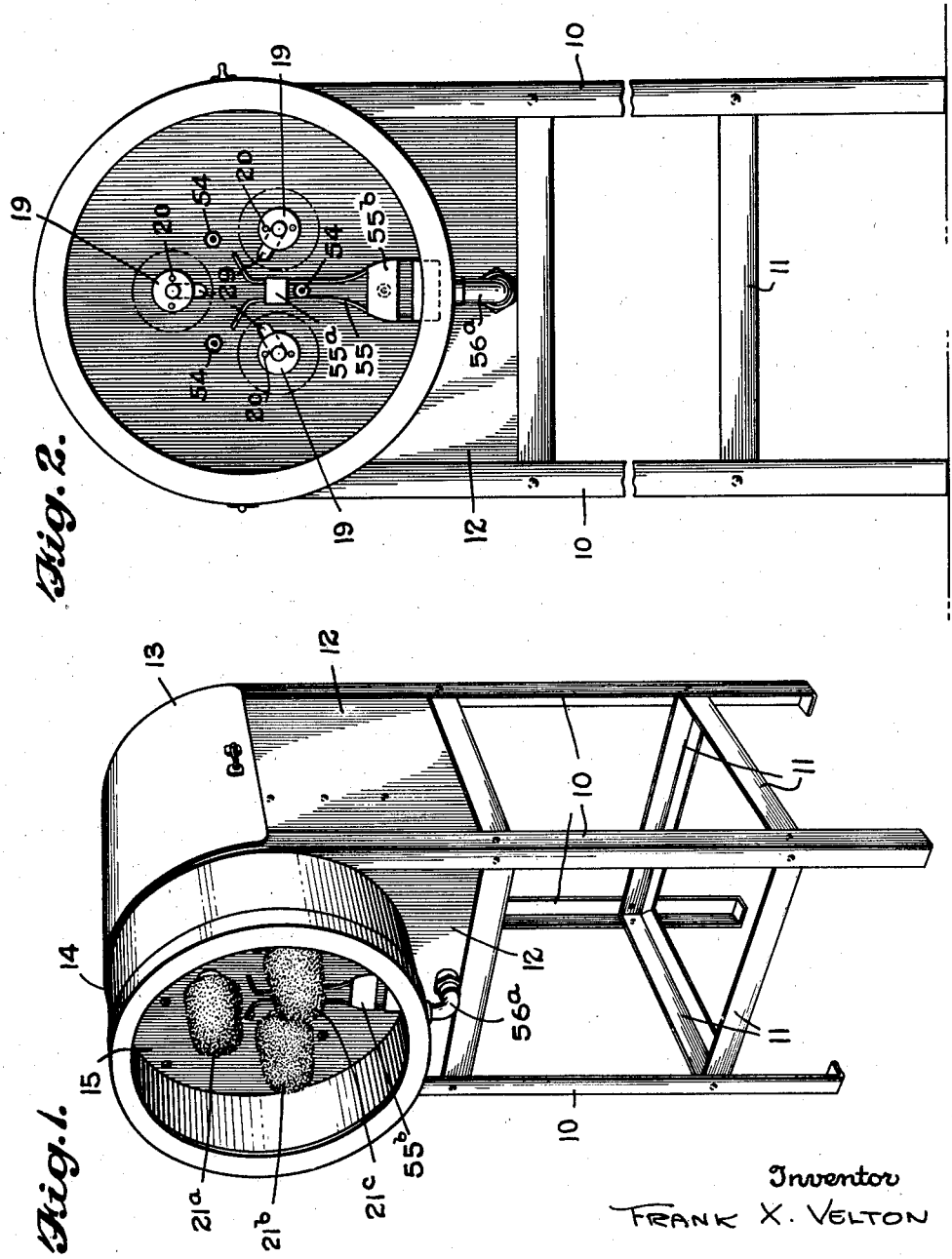
Inventor
FRANK X. VELTON
By KARL W. FLOCKS
Attorney

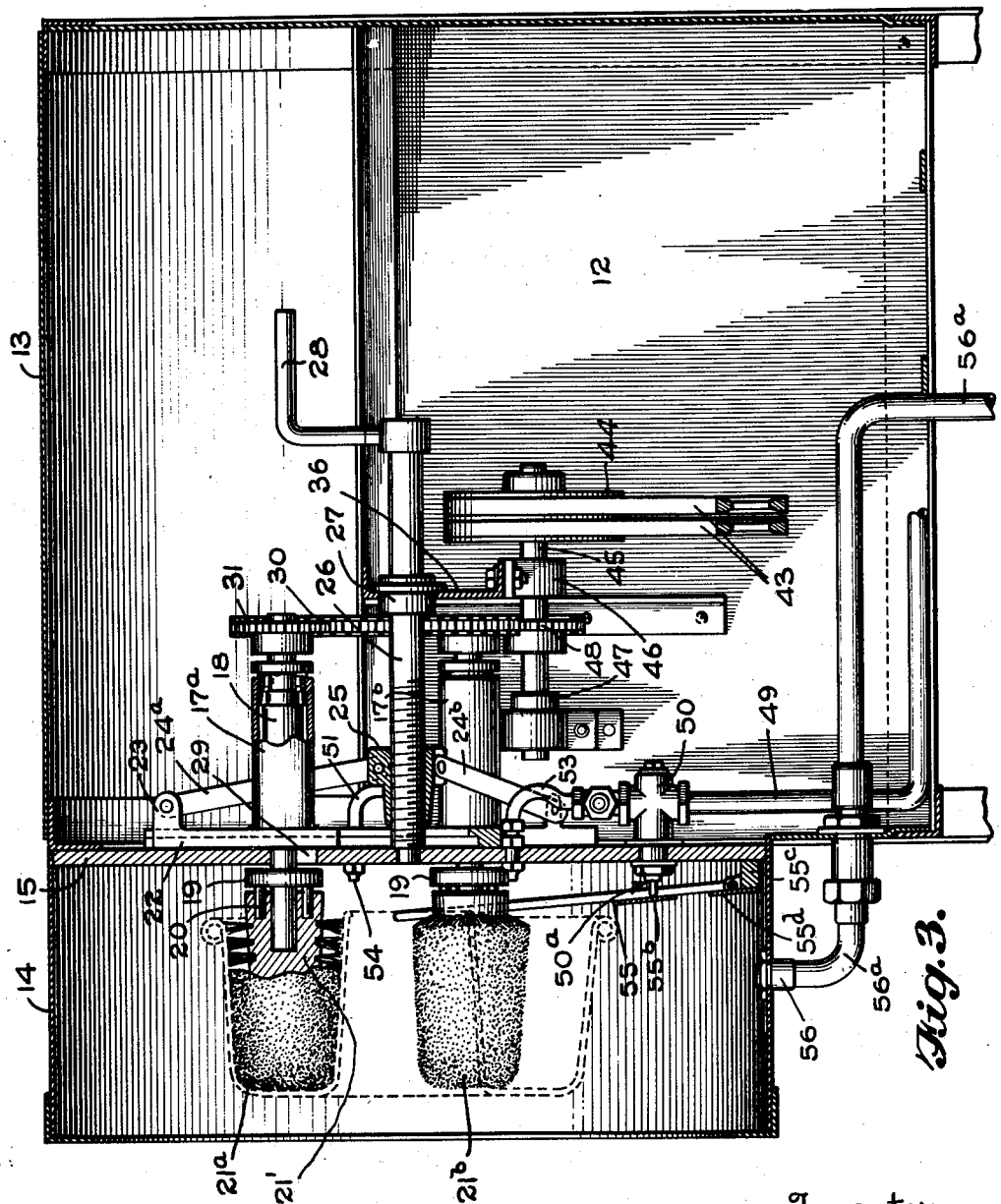

Feb. 24, 1942. F. X. VELTON 2,274,309
WASHER
Filed July 9, 1940 5 Sheets-Sheet 3

Inventor
FRANK X. VELTON
By KARL W. FLOCKS
Attorney

Feb. 24, 1942.     F. X. VELTON     2,274,309
WASHER
Filed July 9, 1940     5 Sheets-Sheet 4

Inventor
FRANK X. VELTON
By   KARL W. FLOCKS
Attorney

Feb. 24, 1942.  F. X. VELTON  2,274,309
WASHER
Filed July 9, 1940   5 Sheets-Sheet 5

Inventor
FRANK X. VELTON
By KARL W. FLOCKS
Attorney

Patented Feb. 24, 1942

2,274,309

UNITED STATES PATENT OFFICE 2,274,309

WASHER

Frank Xavier Velton, Chicago, Ill.

Application July 9, 1940, Serial No. 344,585

18 Claims. (Cl. 15—56)

This invention relates to a machine for washing, cleaning or furbishing utensils and particularly utensils of the annular type having an upwardly projecting central portion or member which forms a hole in the cake or other article baked in the utensil.

Utensils of this type are used to bake angel food cake and other confection and food products extremely popular with the trade and produced in volume in commercial bakeries. Pans used for this purpose must be thoroughly cleansed each time they are used, and to expedite production and maintain relatively low production costs, it is essential that the washing operation be carried out in an expeditious manner.

It is an object of the present invention to provide a machine capable of washing utensils or pans of the type specified easily, quickly and thoroughly.

Another object of the invention is to provide a machine for washing, cleaning or furbishing utensils which may be readily adjusted to clean different sizes of utensils.

A further object of the invention is to provide a machine for washing utensils which is simple in construction and relatively low in cost of manufacture, yet capable of turning out work efficiently and in large quantities.

The foregoing and other objects and advantages will become apparent in view of the following description taken in conjunction with the drawings, wherein:

Fig. 1 is a view in perspective elevation of a machine constructed in accordance with the features of the present invention;

Fig. 2 is a view in front elevation of the machine of Fig. 1;

Fig. 3 is a view in sectional side elevation;

Figure 4:
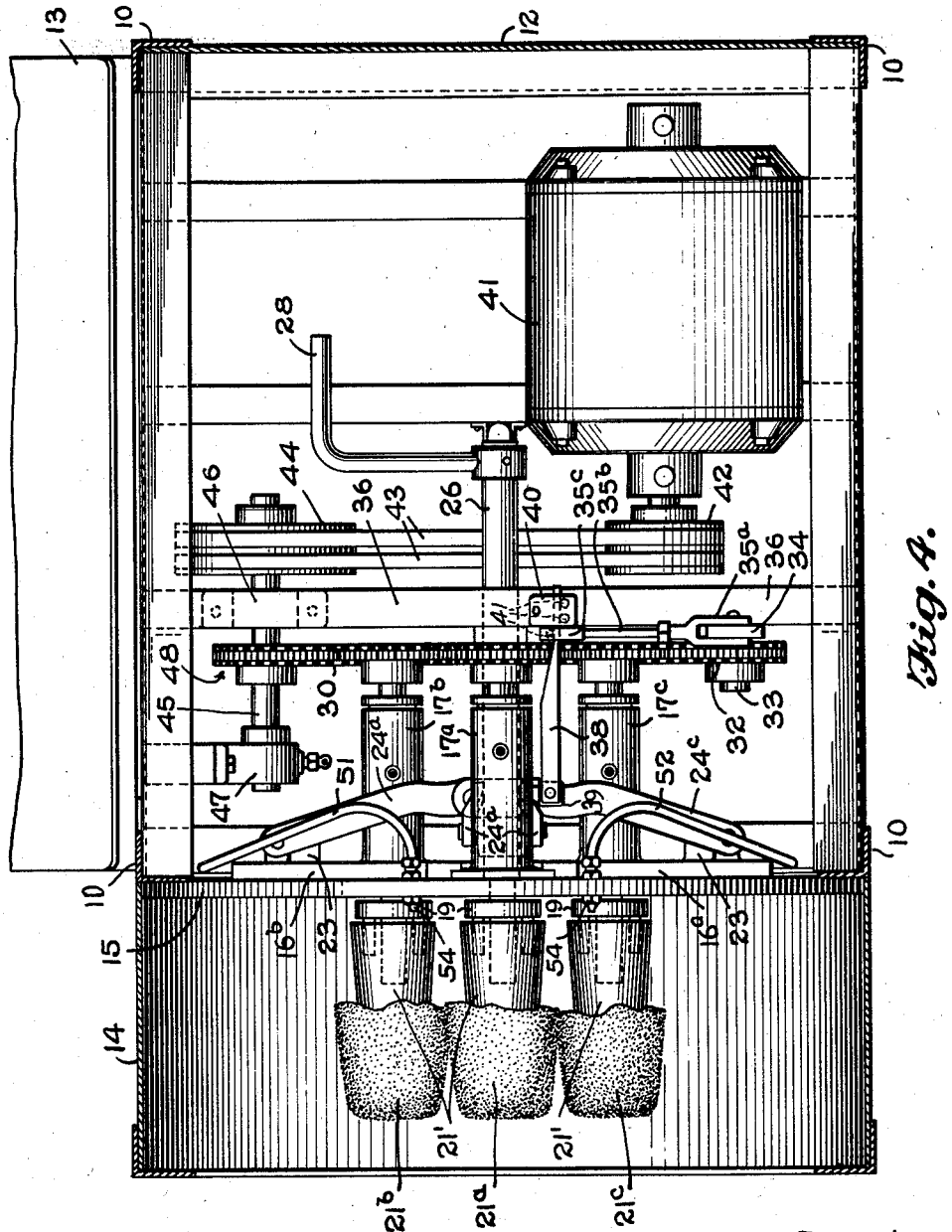
Fig. 4 is a plan view with the cover or lid of the casing or housing in open position.
Figure 7:
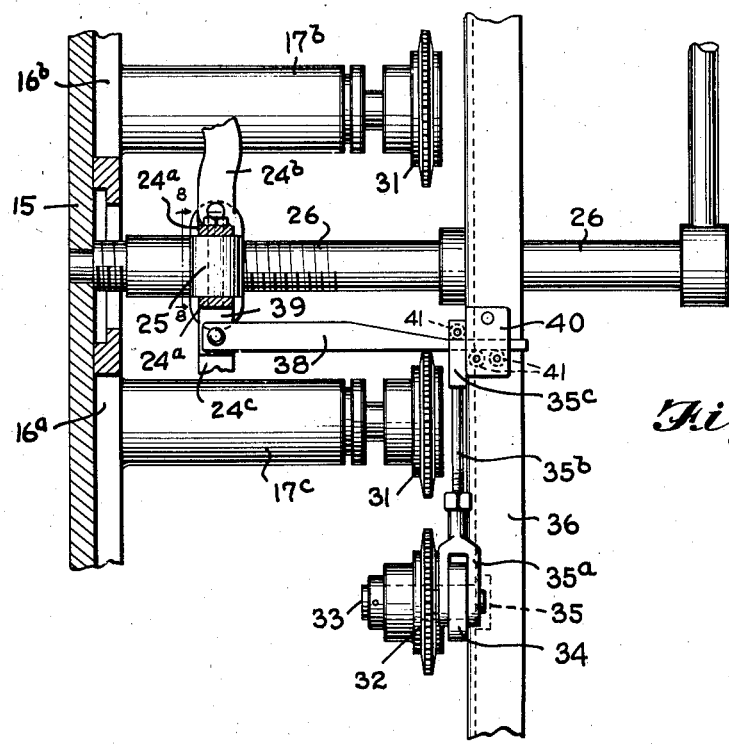

Fig. 7 comprises an enlarged detail view of the adjusting mechanism and cam lever attachment as shown in Fig. 4, with some portions omitted.

Figures 8, 9:
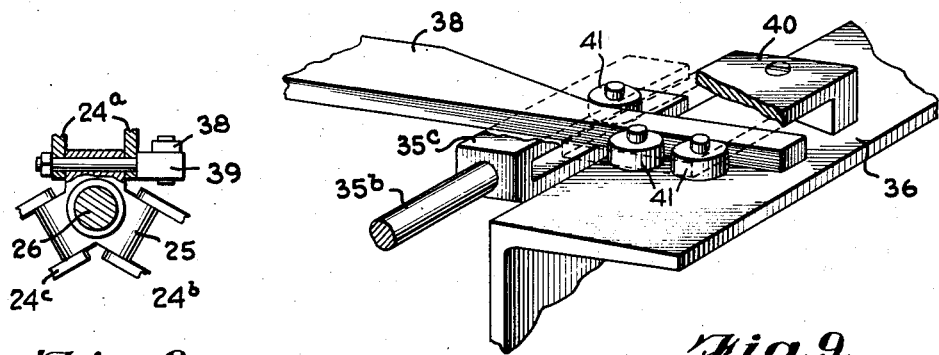

Fig. 8 is a sectional detail, taken along line 8—8 of Fig. 7, and observed in the direction of the arrows.

Fig. 9 is a fragmentary perspective of the cam and roller arrangement of Fig. 7.

Referring to the drawings in detail, the machine is mounted on a stand or supporting framework including legs 10 braced at their lower extremities by members 11. The machine proper is housed by a casing 12 which may be of sheet metal or the like and provided with a hinged cover 13.

Figure 5:
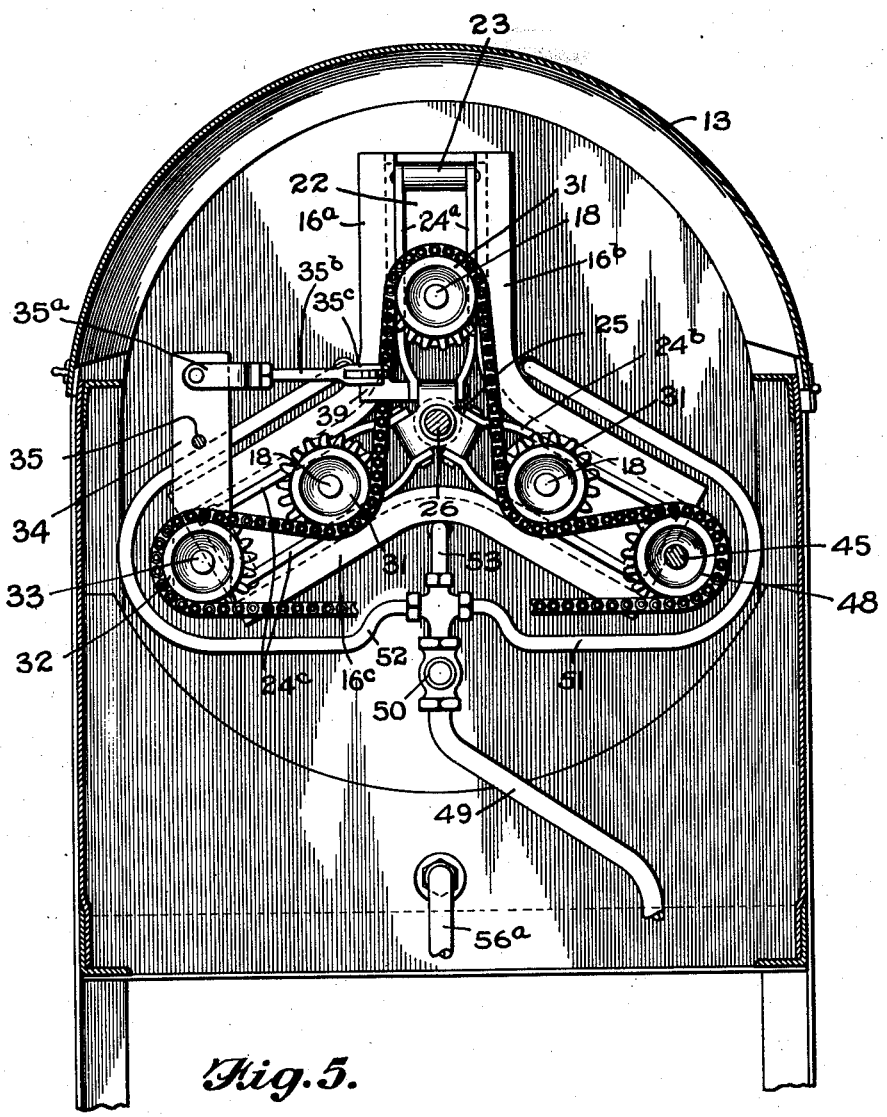
Fig. 5 is a view in rear sectional elevation.

At the front end of the casing is an annular hood or shield 14, said hood at its rear end encircling a face plate 15. This plate may be in the form of a steel disc of suitable thickness and has secured on the rear surface thereof brush-shaft-bearing guides 16ª, 16ᵇ and 16ᶜ defining radial guideways or trackways preferably spaced at approximately 120 degrees from one another. Mounted in these guideways are a plurality of spindle housings 17ª, 17ᵇ and 17ᶜ which rotatably support brush spindles or shafts 18 and their coacting bearing assemblies, note particularly Figs. 3 and 5. On the forward end of each of the brush shafts 18 is fixed a brush holder including disc 19 having fixed therein pins 20. The brush units include brushes proper 21ª, 21ᵇ and 21ᶜ each having a core 21′ which is removably socketed onto the outwardly projecting end of the brush spindle or shaft 18 and the pins 20.

Each of the spindle housings 17ª, 17ᵇ and 17ᶜ is formed at one end with a radial portion 22 having a rearwardly projecting lug 23; and connected to each of these lugs are co-acting pairs of links 24ª, 24ᵇ and 24ᶜ, said links at their inner ends being pivotally anchored to a common adjusting block 25 threaded on an adjusting shaft 26. At its inner end the shaft 26 has bearing in the face plate 15 and at its outer extremity in a bearing member 27, the said shaft being provided with a handle 28 which is readily accessible to an operator.

At the point where each brush spindle 18 projects through the face plate 15, the latter is formed with a clearance slot 29 to allow for radial adjustment.

It will be seen that when the shaft 26 is turned, the adjustor block 25 is advanced either inwardly or outwardly, depending upon the direction of rotation of said shaft, to in turn act through the pairs of links 24ª, 24ᵇ and 24ᶜ to move the spindle housings 17ª, 17ᵇ and 17ᶜ radially inwardly or outwardly together with the brush spindles and brushes carried thereby. When the brushes reach adjusted position rotation of the shaft is stopped, after which they remain firmly held in such position.

It will be seen that in order to accommodate this radial adjustment of the brushes, the drive therefor must be of a flexible nature. This is accomplished by means of a sprocket drive including chain 30, which is trained over sprockets 31 fixed on the rear ends of the brush spindles or shafts 18 and also over an idler sprocket 32 mounted on a stub shaft 33 carried by a lever bracket 34, note Fig. 5, which is fulcrumed on pivot pin 35 fixed in cross frame member 36 and at its upper end has pivotally connected thereto clevis 35$^a$ which has adjustably threaded therein link rod 35$^b$, the latter at its inner end being provided with slotted member or yoke 35$^c$ through which projects cam lever 38. The inner end of the cam lever 38 is pivotally connected to member 39 which in turn is adjustably connected to the block 25, the outer free end of the lever 38 being projected through a guide bracket 40 fixed on the cross frame member 36. Cam rollers 41 are preferably provided on the yoke 35$^c$ and bracket 40 to ease the action of the cam lever 38.

When the brushes are adjusted through rotation of the shaft 26, the cam lever 38 is moved forwardly or rearwardly, depending upon the direction of adjustment. If the brushes are adjusted inwardly, the lever 38 is moved to the right as viewed in Fig. 4 to in turn move the link 35$^b$ to the right and through the bracket lever 34 move idler sprocket 32 to the left as viewed in Fig. 5, taking up on the sprocket chain 30 to compensate for such adjustment. If the brush adjustment is radially outwardly, the idler sprocket is moved inwardly or to the right as viewed in Fig. 5, slackening up on the sprocket chain to accommodate the adjustment.

The drive is primarily from motor 41, pulley 42 and belt 43 to pulley 44, the latter being secured on a shaft 45 which is mounted in bearings 46 and 47 and has secured thereon sprocket 48 over which the sprocket chain 30 is trained. It will be noted that the chain is trained over the respective sprockets in a manner such that two of the brushes are rotated in one direction while the remaining brush is rotated in the opposite direction.

The supply of water or other cleaning fluid is through inlet pipe 49 having inserted therein control valve housing 50 provided with depressible plunger release valve 50$^a$. Beyond the valve housing 50 lines 51, 52 and 53 branch outwardly to discharge nozzles 54 seated in the face plate 15.

The plunger valve 50$^a$ is preferably automatically actuated by means of resilient lever 55 which projects upwardly to a point intermediate the brushes 21$^a$, 21$^b$ and 21$^c$ for contact by the utensil being cleaned. Lever 55 is preferably fork-shaped and formed of spring steel wire connected by plates 55$^a$ and 55$^b$, the latter serving as a contactor for plunger of valve 50$^a$. The lower end of the lever is anchored to face plate 15 through spacer block 55$^c$ having secured on the outer end thereof stop plate 55$^d$. Since the lever 55 is formed of resilient or spring material, it may have either a fixed or pivotal anchorage.

While the brushes 21$^a$, 21$^b$, and 21$^c$ are preferably rotated continuously during operation of the machine, it will be obvious that they could be of the intermittently rotating type with an electric control switch operated by lever 55 or located at a convenient point for independent manual or automatic control.

The water drains from the housing 14 through outlet plug 56 and pipe 56$^a$.

Figure 6:
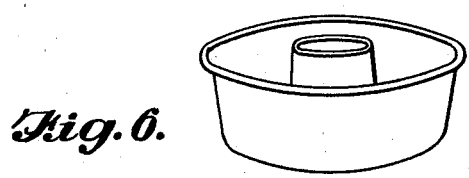
Fig. 6 is a perspective view of one of the pans or utensils for the cleaning of which the machine has been particularly devised.

The machine operates as follows:

Cake pans, which may be of the type shown in Fig. 6, are inserted over the brushes and engage the lever 55 which is depressed and opens the valve 50$^a$, permitting water under pressure to pass through the lines 51, 52 and 53 and be expelled from the nozzles 54. The brushes rotating in opposite directions clean the pan thoroughly while the water is injected against the surface to be cleaned. Whenever there is a run of different size pans, it is only necessary to raise the hood or cover 13 and turn the handle 28, whereupon the block 25 is advanced or retracted to in turn act through the links 24$^a$, 24$^b$ and 24$^c$ to move the brushes radially inwardly or outwardly, simultaneously taking up slack or compensating for the latter by moving the idler sprocket 32 in the proper direction.

It is important that the brush adjustment be accomplished easily and quickly in order to accommodate different size pans without undue delay, and the present machine effectively solves this problem. Another important feature is that the brushes may be adjusted while the machine is in operation, or while the brushes are actually rotating, so that the machine does not have to be stopped each time different sizes of pans are to be cleaned. This avoids intermittently starting and stopping of the machine with consequent loss of time and increased power costs, and also ensures proper adjustment to obtain the most efficient cleaning operation.

It is to be understood that it is within the scope of the invention to associate various size brushes or other cleaning members with the shafts 18 and pins 20, and it is contemplated that such various size units having a uniform mating configuration with the said shafts 18 and pins 20 may be supplied with the washing machine.

It will be obvious to those skilled in the art that various changes may be made in this device without departing from the spirit of the invention and therefore the invention is not limited to what is shown in the drawings and described in the specification but only as indicated in the appended claims.

What is claimed is:

1. In a washing machine of the class described, a plurality of brushes, spindles mounting said brushes for rotation, supports for said spindles permitting their radial adjustment, means for rotating said brushes including a flexible drive member interconnecting said spindles and means operatively connected with said brush mountings and said flexible drive member for radially adjusting said brushes towards and away from one another to accommodate different sizes of articles to be cleaned and simultaneously compensating for either slack or take-up in said flexible drive member.

2. In a washing machine of the class described, a plurality of brushes, shafts mounting the brushes for rotation, shaft supports permitting simultaneously coordinated radial adjusting movement of said shafts toward and from one another, flexible drive means connecting said shafts for simultaneous rotation, means for simultaneously and coordinately adjusting said shafts and the brushes carried thereby, and means for compensating for either slack or take-up in said flexible drive member, said adjusting means and compensating means being operatively associated for simultaneous functioning.

3. In a machine of the class described, a plurality of brushes arranged in spaced relation, brush spindles rotatably mounting the brushes, spindle support means, means for adjusting said support means toward and from each other, sprockets fixed on said spindles, a flexible drive member connecting said sprockets, compensating means for slack or take-up in said flexible drive means, and means for adjusting said spindles and simultaneously actuating said compensating means, irrespective of the state of inertia or motion of said spindles.

4. In a machine of the class described, a plurality of brushes, spindles rotatably mounting said brushes, support means for said spindles permitting limited lateral adjusting movement of said spindles, means for imparting rotation to said spindles including drive sprockets and a flexible drive member connecting the drive sprockets for simultaneous rotation, an idler sprocket, and means for laterally and coordinately adjusting said spindles and their sprockets and simultaneously displacing said idler sprocket in a direction to compensate for slack or take-up in said flexible drive means.

5. In a machine of the class described, a plurality of brushes, spindles mounting said brushes, supports for said spindles permitting limited radial adjusting movement of said spindles relative to their supports, drive sprockets fixed on said spindles and an idler sprocket movably mounted in operative relation to said spindle sprockets, a flexible drive member trained over said spindle sprockets and idler sprocket, means connecting said spindles and brushes for simultaneously adjusting them to accommodate different sizes of articles being cleaned, and means actuated by said adjusting means for simultaneously imparting movement to said idler sprocket to compensate for slack or take-up in said flexible drive means.

6. In a washing machine of the class described, a plurality of brushes, spindles rotatably mounting said brushes, support means for said spindles permitting bodily adjusting displacement of said spindles and brushes relative to their support means for accommodating different sizes of articles being cleaned, a rotatable adjusting shaft, an adjusting member actuated through rotation of said shaft, and means connecting said adjusting member with said spindles and brushes for imparting simultaneous adjusting movement to the latter.

7. In a washing machine of the class described, a plurality of brushes, means comprising spindles rotatably mounting said brushes, housings for said spindles, supports for said spindles and housings permitting relative bodily adjusting movement of said respective spindles with their housings, a rotatable adjusting shaft, an adjusting member threaded on said shaft, and pivotal linkage connections between said adjusting member and said housings whereby when said shaft is rotated, said adjusting member is moved on said shaft to thereby impart the desired adjusting movement to said brushes.

8. In a machine of the class described, a plurality of brushes, spindles rotatably mounting said brushes, sprockets fixed on said spindles, housings rotatably supporting said spindles, supports for said spindles and their respective housings permitting displacement of said respective spindle-housing assemblies relative to each other, a rotatable threaded adjusting shaft, an adjusting member threaded on said shaft, linkage connections between said adjusting member and said housings for imparting the desired adjustment to said brushes through said housings and spindles when said shaft is rotated, a flexible drive member trained over said sprockets and subject to varying tautness with change in housing and spindle position, and means operatively associated with said adjusting member whereby when the shaft is rotated slack or take-up in said flexible drive member is compensated for.

9. In a machine of the class described, a plurality of brushes, spindles rotatably mounting said brushes, a plate through which said spindles project having radially directed slots therein to permit relative adjusting movement of said spindles, bearing housings for said spindles, means movably mounting said housings, a flexible drive member connecting said spindles, a common adjusting member to which said housings are connected, and means for adjusting said latter member.

10. In a washing machine of the class described, a plurality of brushes, spindles rotatably mounting said brushes, bearings for said spindles, housings in which said bearings and spindles are mounted, guides mounting said housings for relative sliding adjusting movement, a flexible drive member connecting said spindles for simultaneous rotation, a rotatable adjusting shaft, an adjusting member threaded on said shaft, and linkage connections between said adjusting member and said housings, adapted for imparting sliding adjusting movement to said housings dependent upon movement of said adjusting member.

11. In a washing machine of the class described, a casing, a plurality of brushes disposed in spaced relation and accessible exteriorly of said casing, spindles rotatably mounting said brushes, a face plate through which said spindles project, said face plate being slotted to permit relative adjusting movement of said spindles, bearings for said spindles, bearing housings for said bearings and spindles, radially arranged guideways movably mounting said housings, a threaded adjusting shaft, an adjusting member threaded on said shaft, link means connecting said adjusting member with said housings and adapted to transmit the adjustment, resulting from the rotation of said adjusting member on its shaft, to the relative spacing of said housings, sprockets fixed on said spindles, an idler sprocket, a flexible drive member trained over said sprockets, and means connecting said idler sprocket with said adjusting member and adapted for moving said idler sprocket to compensate for slack or take-up in the flexible drive member.

12. In a washing machine of the class described, a housing, brushes disposed exteriorly of said housing, spindles rotatably mounting said brushes, a face plate for said housing through which said spindles project, said face plate being provided with guiding means permitting relative adjusting movement of said spindles, said spindles being mounted for simultaneous relative and coordinated adjusting movement towards and away from each other, drive sprockets fixed on said spindles, and a flexible drive member trained over said spindles in a manner such that at least one of said brushes is rotated in a direction opposite that of the remaining brushes.

13. In a washing machine of the class described, a housing, a hood projecting outwardly from said housing, a face plate interposed between said hood and said housing, said face plate being slotted, brush spindles projecting through said slots and having brushes removably mounted on the outwardly projecting ends thereof, radially directed guideways on the inner side of said face plate, housings for said spindles mounted in said guideways, a common rotatable adjusting shaft, a common connecting means for said housings movable through rotation of said shaft, and a flexible drive means connecting said spindles.

14. In a washing machine of the class described, a main casing, a hood projecting forwardly from said casing, a face plate interposed between said hood and casing, brush spindles projecting through said plate and mounted in slots permitting lateral adjustment, said spindles having brushes secured on the outer ends thereof, means for simultaneously adjusting said spindles laterally, ejector nozzles mounted in said face plate, means for supplying water under pressure to said nozzles, a valve controlling the supply of water to said nozzle having a depressible valve member projecting through said face plate, and a lever disposed exteriorly of said face plate for contact by the article being cleaned, said lever having an operative connection with said valve member.

15. In a washing machine of the class described, a main casing, a hood projecting forwardly from said casing, a face plate interposed between said hood and casing, brush spindles adapted for lateral adjustment projected through said plate and mounted in guides permitting lateral adjustment, said spindles having brushes removably secured on the outer ends thereof, means for simultaneously adjusting said spindles laterally, ejector nozzles mounted in said face plate, means for supplying water under pressure to said nozzles, a valve controlling the supply of water to said nozzles having a depressible valve member projecting through said face plate, and a resilient lever mounted adjacent the outer surface of said face plate for contact by the article being cleaned, said lever having a portion adapted to contact and depress said valve member.

16. In combination, a plurality of brushes, rotatable means for supporting said brushes, guide means for allowing radial displacement of said brush supporting means, means for rotating said supporting means comprising a flexible drive member, means connected with said drive member adapted to compensate for either slack or take-up in said flexible drive member, adjusting means adapted for predetermined translatory movement, pivotal link means for connecting said adjusting means with said brush supporting means and with said compensating means, said pivotal link means being so proportioned that movement of said adjusting means to a predetermined extent will radially displace said brush supporting means with the brushes mounted thereon and actuate said slack or take-up compensating means commensurate with the extent of brush supporting means displacement.

17. In a machine combination including a plurality of brushes rotatably mounted on support means, said support means being bodily movable, a flexible drive member for rotating said brush support means and a compensating means for either slack or take-up operatively connected with said flexible drive member, an adjusting means comprising a block mounted on a shaft in threaded relationship thereto and adapted for translatory motion thereon, pivotal link means attached at one extremity to said block and at the other extremity to said brush support means, and means connecting said block with said compensating means, whereby translatory movement of said block will simultaneously adjust the position of the brush supporting means and correspondingly compensate for take-up or slack of said drive member.

18. In a machine combination including a plurality of brushes rotatably mounted on support means, means for sustaining and allowing bodily movement of said support means, a flexible drive member for rotating said brush support means, and adjusting means for radially displacing said brush support means towards and away from one another, a compensating means adapted for adjusting the tautness in said flexible drive member comprising an idler sprocket rotatably mounted on a fulcrumed supporting member and operatively associated with said flexible drive member, link means pivotally associated at one extremity with said supporting member and provided with a slotted member at its other end, a guide bracket, a cam lever, means for adjustably connecting said cam lever at one extremity with said adjusting means, the free end of said lever projecting through said slotted member and said guide bracket, said slotted member and guide bracket being provided with cam rollers to facilitate the action of said cam lever.

FRANK XAVIER VELTON.